April 22, 1952　　C. E. WIEGAND ET AL　　2,593,948
DISTRIBUTED COINCIDENCE CIRCUIT
Filed March 7, 1951
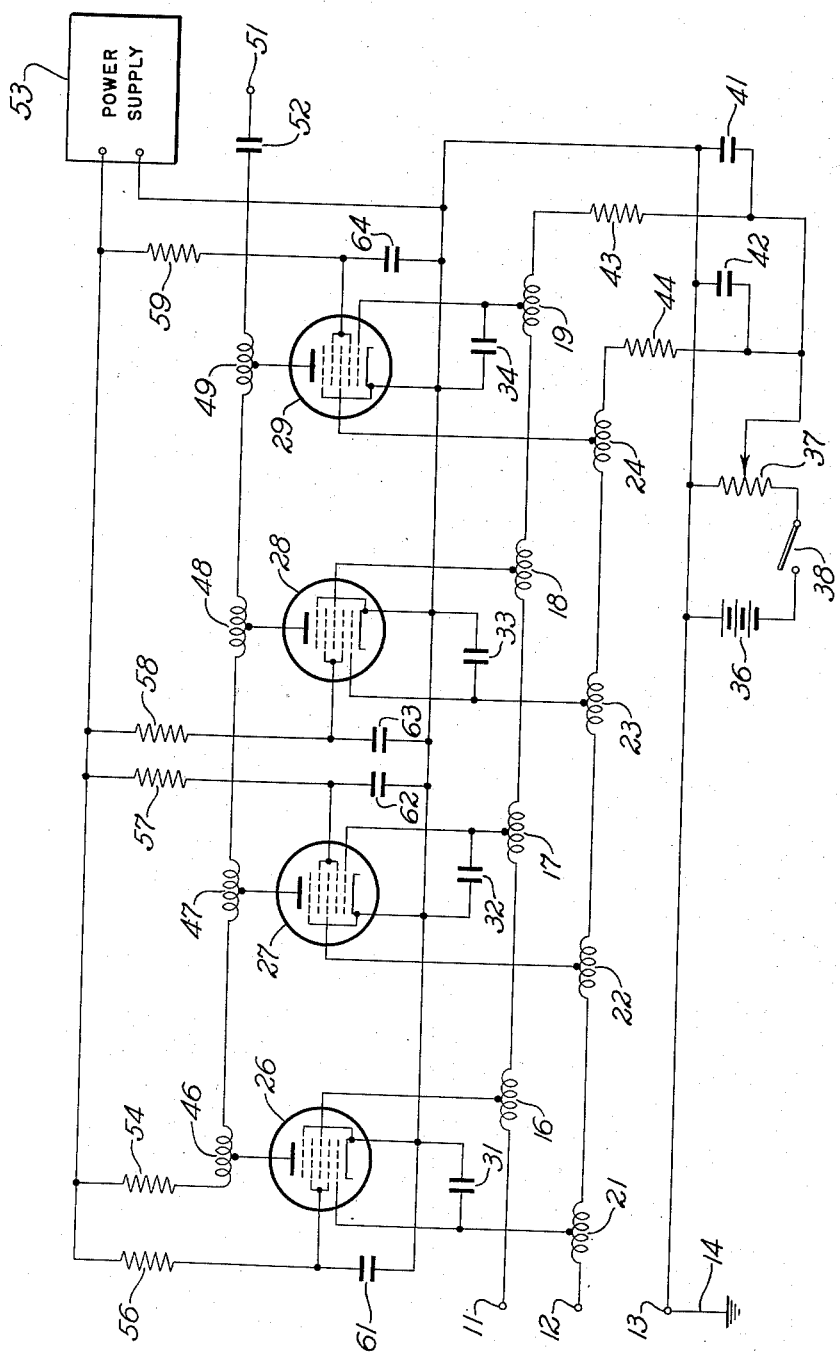
INVENTORS.
CLYDE E. WIEGAND
BY　OWEN CHAMBERLAIN
Roland A. Anderson
ATTORNEY.

Patented Apr. 22, 1952

2,593,948

UNITED STATES PATENT OFFICE 2,593,948

DISTRIBUTED COINCIDENCE CIRCUIT

Clyde E. Wiegand, Oakland, and Owen Chamberlain, Berkeley, Calif., assignors to the United States of America as represented by the United States Atomic Energy Commission Application March 7, 1951, Serial No. 214,342

6 Claims. (Cl. 250—27)

This invention relates to an electronic coincidence circuit and more particularly to a coincidence circuit based on distributed amplification.

With improvements in methods and apparatus for detecting charged particles, such apparatus has become capable of resolving times exceeding that of the auxiliary counting circuits used therewith. Resolving times of the order of $10^{-8}$ sec. have been obtained with certain types of scintillation crystals thereby making it necessary that the counting circuits have a similar resolving time. The present invention has been found capable of a resolving time of $10^{-8}$ sec. when used in connection with scintillation crystal detectors, photomultiplier tubes and distributed amplifiers. In order to provide such a resolving time in a coincidence circuit a plurality of pentagrid converter tubes are employed interconnected in a manner similar to that of distributed amplifiers, with selected lumped constants and providing a separate signal channel to each of the control grids of the tubes. The principles of distributed amplification have been disclosed in British Patent No. 460,562 to W. S. Percival and in the article entitled "Distributed Amplification" appearing in the Proceedings of the I. R. E., vol. 36, page 956, (1948) by Ginzton, Hewlett, Jasberg, and Noe.

In utilizing the principles of distributed amplification in a coincidence circuit, it has been found necessary to balance the interelectrode capacitances of the tubes for the two circuits. A simple means for accomplishing such balance has been provided by alternate connections between the control grids and the two signal channels as will be more fully explained hereinafter.

It is therefore an object of the present invention to provide a new and improved coincidence circuit.

Another object of the present invention is to provide a wide-band coincidence circuit having a resolving time of the order of $10^{-8}$ second.

Still another object of the invention is to provide a pair of balanced grid lines and an anode line with a plurality of converter tubes interconnected between such lines.

A further object of the present invention is to provide staggered connections between the control grid of the tubes and the grid lines so that the capacitance from grid to cathode is equal for each grid line.

A still further object of the invention is to provide a coincidence circuit wherein the velocity of propagation of traveling waves in the grid lines is equal to that in the anode line and no discontinuities in the value of the impedance upon which the waves are incident.

Another important object of the present invention is to provide a mixer circuit for two input signals having widely varying frequencies.

Other objects and advantages will be apparent from the following description and claims considered together with the accompanying drawing in which there is illustrated a schematic wiring diagram of the invention.

Referring to the drawing in detail, three terminals 11, 12, and 13 are provided as a means for connecting a pair of input signal voltages to the circuit. One such terminal 13 is connected to ground by a lead 14 and is common to both of the input voltages. A separate artificial transmission line is connected to each of the other terminals 11 and 12; the first such line comprises four series connected inductances 16, 17, 18, and 19 and the second line comprises four series connected inductances 21, 22, 23, and 24.

In the particular embodiment of the invention shown in the drawing four pentagrid converter tubes 26, 27, 28, and 29 are utilized with the aforementioned transmission lines; however, it will be apparent that a greater or lesser number of such tubes may be utilized depending upon the degree of amplification desired. The first control grids of the first and third tubes (26, 28) are respectively connected to a mid-point of the first and third inductance (21, 23) of the transmission line connected to the second input terminal 12 while the first control grids of the second and fourth tubes (27, 29) are respectively connected to a mid-point of the second and fourth inductances (17, 19) of the transmission line connected to the third input terminal 11. The second control grids of the tubes are similarly connected in a staggered or alternate manner; that is, the second control grids of the first and third tubes (26, 28) are respectively connected to a mid-point of the first and third inductances (16, 18) of the transmission line connected to the third terminal 11 while the second control grids of the second and fourth tubes (27, 29) are respectively connected to a mid-point of the second and fourth inductances (22, 24) of the transmission line connected to the second input terminal 12. The foregoing connections are necessary to assure a balanced relationship between each of the grid transmission lines with respect to the line to ground capacitance. In addition to the foregoing balance requirement for the grid transmission lines, it is necessary that each section of the line should have equal capacitance and, to accomplish this latter, four capacitors 31, 32, 33, and 34 are provided and respectively connected between the first control and cathode of each of the tubes 26, 27, 28, and 29.

To provide a grid bias voltage for the tubes 26, 27, 28, and 29 a battery 36 is connected in parallel with a series connected potentiometer 37 and single throw switch 38. Since it is desired to impress a negative bias voltage, the positive terminal of the battery 36 is connected to the cathodes of the tubes 26, 27, 28, and 29 and to the grounded input terminal 13. The adjustable element of the potentiometer 37 is connected to the grounded terminal 13 through two by-pass capacitors 41 and 42 and to one end of each of two resistors 43 and 44. The resistor 43 is further connected to the grid transmission line connected to the input terminal 11 and the resistor 44 to the grid transmission line connected to the input terminal 12. Thus an adjustable negative bias voltage is provided for the control grids of the tubes 26, 27, 28, and 29.

An anode transmission line is provided and comprises four series connected inductances 46, 47, 48, and 49. A mid-point of each of the inductances 46, 47, 48, and 49 is respectively connected to the anode of the tubes 26, 27, 28, and 29. One end of such anode transmission line is connected to an output terminal 51 through a coupling capacitor 52 and the other end is connected to the positive terminal of a conventional power supply 53 by means of a dropping resistor 54. Thus a suitable operating voltage is supplied to the anodes of tubes 26, 27, 28, and 29, since the negative terminal of the power supply 53 is connected to the grounded cathodes of the tubes.

The two screen grids of each tube 26, 27, 28, and 29 are connected together within the tube envelope and are respectively connected externally to the positive terminal of the power supply 53 by four resistors 56, 57, 58, and 59. Four by-pass capacitors 61, 62, 63, and 64 are respectively connected from each external screen grid connection of the tubes 26, 27, 28, and 29 to the grounded cathode of the tubes.

In constructing the present invention in accordance with the foregoing description of connections, it is necessary to consider several important requirements of such a discriminator circuit. For proper coincidence counting the circuit should ordinarily have input circuits which are equivalent in all respects. Thus, as stated previously, the input capacitances of the two control grids of the selected converter tubes 26, 27, 28, and 29 are not equal and their effectiveness in controlling the anode current is different. To correct for the foregoing, the connections between such control grids and the input grid transmission lines are alternately staggered, as described above, and the capacitances are equalized by the addition of capacitors 31, 32, 33, and 34 having values substantially equal to the difference between the grid to cathode capacitance of the two control grids. Thus it is clearly apparent that equivalent input circuits are provided to such an extent that the two may be interchanged without affecting operation.

In employing the principles of distributed amplification to the present invention, it is necessary that the velocity of the waves be equal on the grid transmission lines and also on the anode transmission line. It is also necessary that there should be no discontinuities in the value of the impedance upon which the traveling waves are incident. Neglecting losses, it is well known that the velocity of propagation of the traveling waves will be equal when $$L_{g1}C_{g1}=L_{g2}C_{g2}=L_pC_p$$

where $L_{g1}$ refers to the series inductance in one of the grid transmission lines, $C_{g1}$ refers to shunt capacitance of such grid transmission line including the interelectrode capacitance of the tubes, $L_{g2}$ and $C_{g2}$ refer to similar quantities for the other grid transmission line, and $L_p$ and $C_p$ refer to similar quantities for the anode transmission line.

Using other well-known formulae the corresponding impedances for the transmission lines are:

$$Z_{g1}=\sqrt{\frac{L_{g1}}{C_{g1}}};\ Z_{g2}=\sqrt{\frac{L_{g1}}{C_{g2}}}$$

and $$Z_p=\sqrt{\frac{L_p}{C_p}}$$

It will be readily apparent that when $Z_{g1}=Z_{g2}$ the circuit is symmetrical and that it is not necessary that $Z_{g1}=Z_p$. The values of $Z_{g1}$, $Z_{g2}$, and $Z_p$ may be determined, for optimum operation, from the output impedance of the devices working into the grid lines and the input impedance of the device to be driven from the anode line. Knowing such values of impedance, the interelectrode capacitances of the tube to be used, and the foregoing relationships therebetween, the values of the inductances may be readily determined. The coil constants for such inductances may then be determined by using formulae, to be found in any standard handbook on filter networks, for m-derived T section filter networks. Having thus established the values of the elements of the transmission lines of the circuit, it remains but to establish that the resistors 43 and 44 connecting the bias voltage to the grid lines should have the value of the impedance of such lines and that the resistance 54 connecting the positive terminal of the power supply 53 to the anode line have the value of the characteristic impedance of such line. The foregoing requirements should be carried out substantially as set forth to avoid the occurrence of reflected voltage waves along the lines.

Now consider the operation of the circuit, as described in the foregoing, with the power supply 53 energized and the potentiometer 37 adjusted to bias the control grids of the tubes 26, 27, 28, and 29 negatively. Such negative bias should be sufficient to maintain the tubes in a nonconducting state when no signal voltages are applied at the input terminals 11 and 12. It will then be readily apparent that the tubes 26, 27, 28, and 29 will conduct only at such time as a positive pulse of voltage is impressed simultaneously at each of the two control grids of each tube. In such manner an output pulse of voltage occurs at the output terminal 51 as an indication of coincidence.

As has been stated previously, it has been found that by utilizing the foregoing circuit that a resolving time of $10^{-8}$ seconds has been attained which is substantially better than the capabilities of present coincidence circuits. It will be readily appreciated that the wide-band feature of the present circuit renders it adaptable for use as a modulator or mixer of frequencies varying over a wide range and that, as has been set forth previously, the number of converter tubes illustrated in the drawing is merely representative and should in no manner be construed as limiting.

While the salient features of this invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a coincidence circuit of the class described, the combination comprising a plurality of vacuum tubes each having at least an anode, two control grids, and a cathode, a first plurality of series-connected inductances having a tap of each respectively connected to one of the control grids of each of said tubes, a second plurality of series-connected inductances having a tap of each respectively connected to the remaining control grids of said tubes, a third plurality of series-connected inductances having a tap of each respectively connected to the anodes of said tubes, means for impressing a negative bias voltage on the control grids of said tubes, means for impressing an operating voltage across said tubes, and separate means connected to said first and second series of inductances for providing an input thereto.

2. In a coincidence circuit of the class described, the combination comprising a plurality of vacuum tubes each having at least an anode, a first control grid, a second control grid, and a cathode, a first plurality of series-connected inductances having a tap of each respectively and alternately connected to said first and second control grids, a second plurality of series-connected inductances having a tap of each respectively and alternately connected to the remaining of said first and second control grids, a third plurality of series-connected inductances having a tap of each respectively connected to the anodes of said tubes, means connected to said control grids for impressing a negative bias voltage thereon, means connected to said anodes for impressing an operating voltage, and means connected to said first and second series of inductances for providing a connection for separate positive input voltages whereby an output voltage is developed at one end of said third series of inductances when both grids of said tubes are simultaneously driven positive.

3. In a coincidence circuit of the class described, the combination comprising a plurality of similar vacuum tubes each having at least an anode, a first control grid, a second control grid, and a cathode, a first plurality of series-connected inductances having a mid-point tap of each respectively and alternately connected to said first and second control grids, a second plurality of series-connected inductances having a mid-point tap of each respectively and alternately connected to the remaining of said first and second control grids, a plurality of capacitors connected one between the first control grid and cathode of each of said tubes and having a value substantially equal to the difference between the control grid to cathode capacitance of said first and second control grids, a third plurality of series-connected inductances having a mid-point tap of each respectively connected to the anodes of said tubes, means impressing a negative bias voltage on said first and second control grids, means impressing an operating voltage across said tubes, and separate means connected to said first and second series of inductances for providing an input connection thereto.

4. In a coincidence circuit of the class described, the combination comprising a plurality of similar vacuum tubes each having at least an anode, a first control grid, a second control grid, and a cathode, a first plurality of series-connected inductances having a mid-point tap of each respectively and alternately connected to said first and second control grids, a second plurality of series-connected inductances having a mid-point tap of each respectively and alternately connected to the remaining of said first and second control grids, a plurality of capacitors connected one between the first control grid and cathode of each of said tubes and having a value substantially equal to the difference between the control grid to cathode capacitance of said first and second control grids, a third plurality of series-connected inductances having a mid-point tap of each respectively connected to the anodes of said tubes, means connected at one end of said first and second series of inductances for impressing a negative bias voltage on the control grids of said tubes, means connected at the other end of said first and second series of inductances for providing separate input connections thereto, means connected at one end of said third series of inductances for impressing operating voltages at the anodes of said tubes, and means connected at the other end of said third series of inductances for providing an output connection for supplying voltage when both grids of said tubes are simultaneously driven positive.

5. A coincidence circuit of claim 4 wherein the values of inductance of the first and second series of inductances are substantially equal and have a value determined by the interelectrode capacitance of said tubes, the desired frequency passband, and desired impedance of an m-derived filter network.

6. A coincidence circuit of claim 5, wherein the velocity of wave propagation along the three series of inductances is substantially equal.

CLYDE E. WIEGAND.
OWEN CHAMBERLAIN.

REFERENCES CITED

The following references are of record in the file of this patent:

"Distributed Amplification," by Edward L. Ginzton et al., Proc. I. R. E. vol. 36, No. 8, August 1948.